(12) United States Patent
Lee et al.

(10) Patent No.: US 10,818,309 B2
(45) Date of Patent: Oct. 27, 2020

(54) APPARATUS FOR NOISE CANCELING AND METHOD FOR THE SAME

(71) Applicant: LG ELECTRONICS INC., Seoul (KR)

(72) Inventors: Bongki Lee, Seoul (KR); Youngman Kim, Seoul (KR); Keunsang Lee, Seoul (KR); Jaewoong Jeong, Seoul (KR); Seunghyun Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/536,990

(22) Filed: Aug. 9, 2019

(65) Prior Publication Data
US 2020/0211580 A1 Jul. 2, 2020

(30) Foreign Application Priority Data
Dec. 27, 2018 (KR) .......................... 10-2018-0170794

(51) Int. Cl.
*G10L 21/0216* (2013.01)
*G10L 25/78* (2013.01)
(Continued)

(52) U.S. Cl.
CPC .......... *G10L 21/0216* (2013.01); *G06F 17/18* (2013.01); *G06N 3/0481* (2013.01);
(Continued)

(58) Field of Classification Search
CPC ..... G10L 21/0216; G10L 25/78; G10L 25/51; G10L 21/02; G10L 25/30; G06N 3/08; G06N 3/04; G06N 20/10; G06F 17/18
(Continued)

(56) References Cited

U.S. PATENT DOCUMENTS 10,446,170 B1 * 10/2019 Chen ...................... G06N 20/00
10,522,167 B1 * 12/2019 Ayrapetian .......... G10L 21/0216
(Continued)

FOREIGN PATENT DOCUMENTS

KR 1020030078218 10/2003
KR 101807961 12/2017
(Continued)

OTHER PUBLICATIONS

Korean Intellectual Property Office Application No. 10-2018-0170794, Office Action dated Oct. 31, 2019, 6 pages.
(Continued)

*Primary Examiner* — Melur Ramakrishnaiah
(74) *Attorney, Agent, or Firm* — Lee, Hong, Degerman, Kang & Waimey PC

(57) ABSTRACT

An embodiment of the present invention provides an apparatus for noise canceling that includes: an input unit configured to receive an input voice signal; and one or more processors configured to perform a first noise cancellation using as input the received input voice signal to generate a first voice signal by cancelling noise from the input voice signal using a noise canceling model which is trained using a plurality of reference voice signals, perform a second noise cancellation using as input the first voice signal generated by the noise canceling model to generate a second voice signal in which residual noise is canceled from the first voice signal using statistical analysis, and generate an output voice signal comprising an encoding of the second voice signal.

13 Claims, 12 Drawing Sheets

(51) Int. Cl.
*G10L 25/51* (2013.01)
*G06N 3/04* (2006.01)
*G06N 20/10* (2019.01)
*G06F 17/18* (2006.01)
*G06N 3/08* (2006.01)

(52) U.S. Cl.
CPC .............. *G06N 3/08* (2013.01); *G06N 20/10* (2019.01); *G10L 25/51* (2013.01); *G10L 25/78* (2013.01); *G10L 2025/783* (2013.01)

(58) Field of Classification Search
USPC ....... 381/71.1, 71.6, 94.7, 94.3, 56; 704/233
See application file for complete search history.

(56) References Cited

U.S. PATENT DOCUMENTS

| | | | | |
|---|---|---|---|---|
| 2003/0040908 A1* | 2/2003 | Yang | ...................... | H04R 3/005 704/233 |
| 2006/0035593 A1* | 2/2006 | Leeds | ................... | G10L 19/265 455/67.13 |
| 2015/0025880 A1 | 1/2015 | Le Roux et al. | | |
| 2017/0323653 A1* | 11/2017 | Hassan al Banna | .... | G10L 15/20 |
| 2018/0253635 A1 | 9/2018 | Park | | |
| 2018/0286425 A1* | 10/2018 | Baek | ........................ | G10L 25/30 |

FOREIGN PATENT DOCUMENTS

| | | |
|---|---|---|
| KR | 1020180038219 | 4/2018 |
| KR | 1020180101055 | 9/2018 |
| WO | 2015008699 | 1/2015 |

OTHER PUBLICATIONS

PCT International Application No. PCT/KR2019/009876, Written Opinion of the International Searching Authority dated Nov. 21, 2019, 9 pages.

Kim, S. et al., "A Comparison of Speech Enhancement Algorithms Based on Deep Neural Networks for Continuous Speech Recognition", Proceedings of Symposium of the Korean Institute of Communications and Information Sciences, Jun. 2017, 1 page.

* cited by examiner

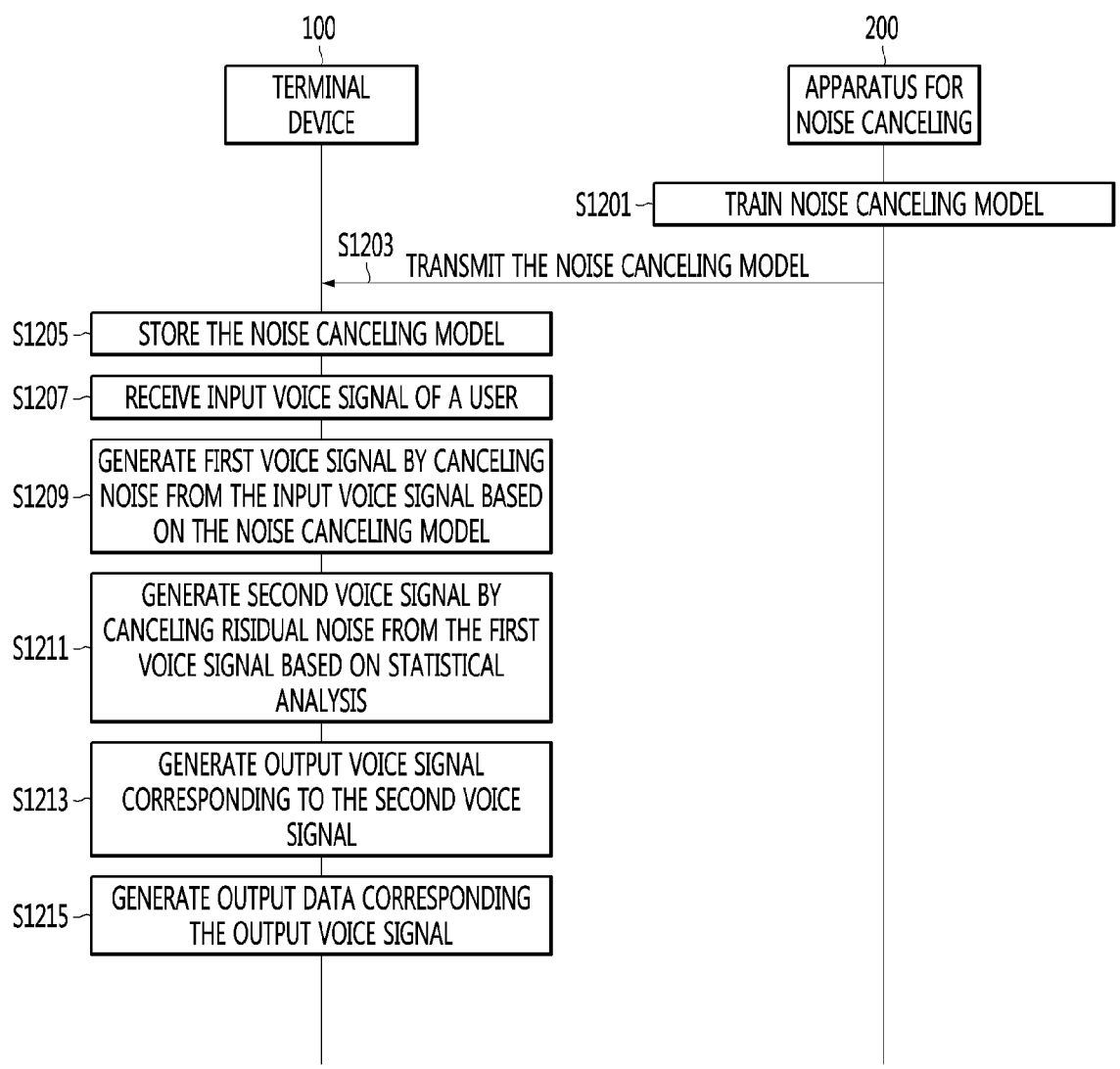

APPARATUS FOR NOISE CANCELING AND METHOD FOR THE SAME

CROSS-REFERENCE TO RELATED APPLICATIONS

Pursuant to 35 U.S.C. § 119(a), this application claims the benefit of earlier filing date and right of priority to Korean Patent Application No. 10-2018-0170794, filed on Dec. 27, 2018, the contents of which are hereby incorporated by reference herein in its entirety.

BACKGROUND

Field of the Invention

The present invention relates to an apparatus for noise canceling and a method for the same. In detail, the present invention relates to an apparatus and method for noise canceling, the apparatus and method canceling noise from an input voice signal on the basis of a machine learning algorithm or a deep learning algorithm and statistical analysis.

Description of the Related Art

Recently, as the demand for voice secretaries for smart phones (e.g., Bixby, Google Assistant, and Q-voice by LG) increases, the necessity for a voice recognition technology for smart phones that shows a high-level voice recognition rate is increased. The voice recognition ability of smart phones depends on the surrounding environment and greatly decreases in an environment with abnormal noise such as speech sounds of surrounding people, surrounding music, and TV sound. Accordingly, it is important to create a clear voice signal by canceling noise in a noisy environment for improvement of the voice recognition ability.

Existing noise canceling methods use beam-forming that cancels noise or locates a user on the basis of the probability of noise existing, but they have a defect that their noise canceling ability is remarkably deteriorated when the user continuously changes his/her location or there is a noise source (TV, surrounding speech sound, etc.) that is similar to a voice.

Meanwhile, a noise canceling method using deep learning has an excellent ability to cancel noise of a noise source similar to a voice, but the voice with noise canceled is considerably distorted and noise with a strong signal at a low frequency band such as an automotive noise is not easy to cancel.

Accordingly, there is a need for a technology of canceling noise from a recognition signal while minimizing distortion by canceling the limits in the existing noise canceling methods.

The background art described above is technological information that the inventor(s) has kept to derive the present invention or has acquired in the process of inducting the present invention, so it should not be construed as being a technology that has been published before application of the present invention.

DOCUMENTS OF RELATED ART (Patent Document 1) Korean Patent Publication No. 10-1807961

SUMMARY OF THE INVENTION

An object of the present invention is to provide an apparatus and method for noise canceling, the apparatus and method cancel noise from an input voice signal while suppressing distortion on the basis of a machine learning algorithm or a deep learning algorithm and statistical analysis.

Another object of the present invention is to provide an apparatus and method for noise canceling, the apparatus and method cancel noise while suppressing distortion that is generated when it fails to estimate a suitable target feature vector from a noise canceling model.

Another object of the present invention is to provide an apparatus and method for noise canceling, the apparatus and method effectively cancel residual noise on the basis of statistical analysis using a speech presence probability.

An embodiment of the present invention trains a noise canceling model using a machine learning algorithm or a deep learning algorithm, generates a first voice signal by canceling noise from an input voice signal on the basis of the noise canceling model, generates a second voice signal by canceling residual noise from the first voice signal on the basis of statistical analysis on a speech presence probability, and generates an output voice signal from the second voice signal.

An embodiment of the present invention corrects a target feature vector estimated from an input voice signal on the basis of a noise canceling model by setting a lower limit of a target value and generates a first voice signal from the input voice signal using the corrected target feature vector.

An embodiment of the present invention corrects a speech presence probability in consideration of difference information of a first voice signal and an input voice signal and generates a second voice signal from the first voice signal using the corrected speech presence probability.

According to various embodiments of the present invention, since noise is primarily canceled using a noise canceling model trained through a machine learning algorithm or a deep learning algorithm and residual noise is secondarily canceled using a speech presence probability, it is possible to effectively cancel noise while taking all advantages of noise canceling methods.

According to various embodiments of the present invention, it is possible to secure a minimum gain when canceling noise through a noise canceling model by correcting and using a target feature vector estimated and acquired from the noise canceling model, and it is possible to effectively suppress distortion that is generated even if the noise canceling model fails in estimation through the minimum gain.

According to various embodiments of the present invention, a speech presence probability is corrected in consideration of difference information of a first voice signal and an input voice signal, whereby it is possible to more accurately estimate the power spectrum of residual noise in consideration of whether noise has been primarily sufficiently canceled through a noise canceling model, and accordingly, it is possible to effectively cancel residual noise while suppressing distortion.

BRIEF DESCRIPTION OF THE DRAWINGS

FIG. 12 is a ladder diagram illustrating a method for noise canceling according to an embodiment of the present invention.

DETAILED DESCRIPTION OF THE INVENTION

Figure 1:
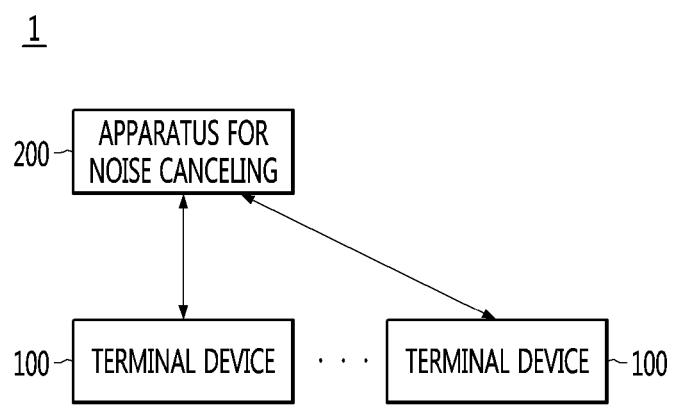
FIG. 1 is a block diagram illustrating a configuration of a system for noise canceling 1 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score. An artificial neural network is specified by hyperparameters which are set before training and related to the configuration and structure of a model, and model parameters which are determined by training and determine the contents of the model.

The hyperparameters include not only parameters describing structure properties of an artificial neural network, but also several parameters that have to be initially set for training such as the initial value of a model parameter. Further, the hyperparameters may include, in broad meaning, functions and algorithms that are used for training of the artificial neural network.

For example, the number of hidden layers, the number of hidden nodes included in each of the hidden layers, initial weight values between nodes, initial bias values between nodes, the size of a mini-batch, the number of times of repeating training, a learning rate, etc. are included in the hyperparameters. Further, in broad meaning, a loss function or a cost function, an optimization algorithm, an input feature vector, a target feature vector, an activation function of nodes, etc. may be included in the hyperparameters. Weights between nodes and biases between nodes etc. may be included in the model parameter.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function uses a means squared error (MSE) or a cross entropy error (CEE).

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

In the GD, the step size can be determined on the basis of a gradient and a learning rate that are obtained by partially differentiating a loss function with a target model parameter.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram illustrating a configuration of a system 1 for noise canceling according to an embodiment of the present invention.

Referring to FIG. 1, a system for noise canceling 1 may include an apparatus for noise canceling 200 and one or more terminal devices 100.

In an embodiment, the system for noise canceling 1 may be composed of only the terminals 100 without the apparatus for noise canceling 200.

The terminal device 100 may be a television (TV), a projector, a mobile phone, a smart phone, a notebook, a laptop computer, a digital broadcasting terminal device, a PDA (personal digital assistants), a PMP (portable multimedia player), a navigation system, a slate PC, a table PC, an ultarbook, a wearable device (e.g., a smart watch, a smart glass, an HMD (head mounted display), a set-top box, a DMB receiver, a radio, a washing machine, a refrigerator, a fixed robot, a movable robot, etc.

That is, the terminal device 100 may be implemented as various appliances that are used at home, and may be applied to a fixed or movable robot.

The terminal device 100 can perform a function of a voice agent. The voice agent may be a program that recognizes voice of a user and output a response suitable for the recognized user's voice using voice.

It is required to find out the meaning information by analyzing an input voice signal in order to create response data and it is required to cancel noise in order to increase analysis accuracy of the input voice signal, and such canceling of noise may be performed by the terminal device 100 or the apparatus for noise canceling 200.

In an embodiment, the apparatus for noise canceling 200 only trains and provides a noise canceling model, using a machine learning algorithm or a deep learning algorithm, to the terminal device 100 and the terminal device 100 can directly cancel noise from an input voice signal using the received noise canceling model.

In an embodiment, the apparatus for noise canceling 200 can train a noise canceling model using a machine learning algorithm or a deep learning algorithm, can receive an input voice signal from the terminal device 100 and directly cancel noise from the input voice signal, and can provide the result to the terminal device 100.

In an embodiment, the terminal device 100 can directly train a noise canceling model using a machine learning algorithm or a deep learning algorithm and can cancel noise from an input voice signal using the trained noise canceling model.

Though will be described below, according to the present invention, noise is primarily canceled from an input voice signal on the basis of a noise canceling model and residual noise is secondarily canceled on the basis of statistical analysis.

The embodiments described above require many resources to train a noise canceling model, so they are classified on the basis of the subjects that train the noise canceling model and the present invention is not limited thereto.

The apparatus for noise canceling 200, which is a separately provided external server, can perform the same function as that of a learning processor 130 of the terminal device 100.

That is, the apparatus for noise canceling 200 may be configured to receive, classify, store, and output information to be used for data mining, data analysis, intelligent decision-making, and a machine learning algorithm. The machine learning algorithm may include a deep learning algorithm.

The apparatus for noise canceling 200 can communicate with at least one terminal device 100 and can derive a result by analyzing or training data instead of or by helping the terminal device 100. The meaning of helping another device may mean distribution of a processing power through distributed processing.

The apparatus for noise canceling 200 can communicate with a voice server (not shown) and can derive meaning information corresponding to voice data instead of or by helping the voice server (not shown).

A plurality of apparatuses for noise canceling 200 may be provided to configure a set of apparatuses for noise canceling (or a cloud server), and at least one apparatus for noise canceling 200 included in the set of apparatuses for noise canceling 200 can derive a result by analyzing or training data through distributed processing.

The apparatus for noise canceling 200 can transmit a noise canceling model trained through machine learning or deep learning to the terminal device 100 periodically or in response to a request.

The voice server (not shown) can acquired meaning information by receiving a voice signal that is processed by the terminal device 100 or the apparatus for noise canceling 200, and can return the acquired meaning information or response information corresponding to the acquired meaning information.

The voice server (not shown) can acquire meaning information corresponding to voice data through or together with the apparatus for noise canceling 200.

The voice server (not shown) and the apparatus for noise canceling 200 may be configured as an integrated server. Providing a plurality of or one server, and separating servers for functions or integrating servers correspond to various embodiments and the present invention is not limited to the present invention.

Figure 2:
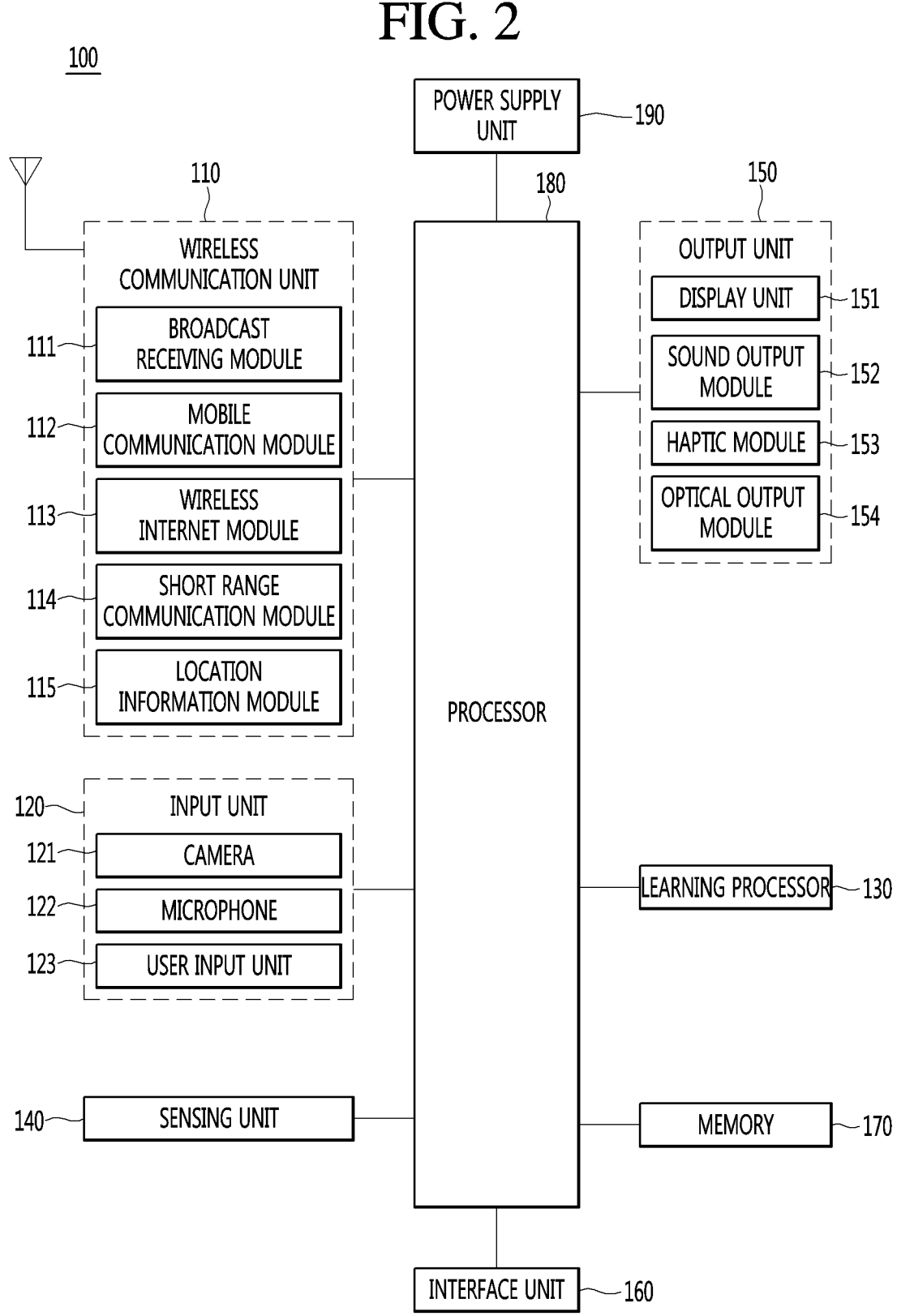
FIG. 2 is a block diagram illustrating a configuration of a terminal 100 according to an embodiment of the present invention.

FIG. 2 is a block diagram illustrating a configuration of a terminal 100 according to an embodiment of the present invention.

Referring to FIG. 2, the terminal 100 may include a wireless communication unit 110, an input unit 120, a learning processor 130, a sensing unit 140, an output unit 150, an interface unit 160, a memory 170, a processor 180, and a power supply unit 190.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technique, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously trained information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 2. Furthermore, in order to execute the application program, the processor 180 may combine at least two of the components in the mobile terminal 100 and may then operate it.

The power supply unit 190 may receive external power or internal power under a control of the processor 180 and may then supply power to each component in the mobile terminal 100. The power supply unit 190 includes a battery and the battery may be a built-in battery or a replaceable battery.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

Figure 3:
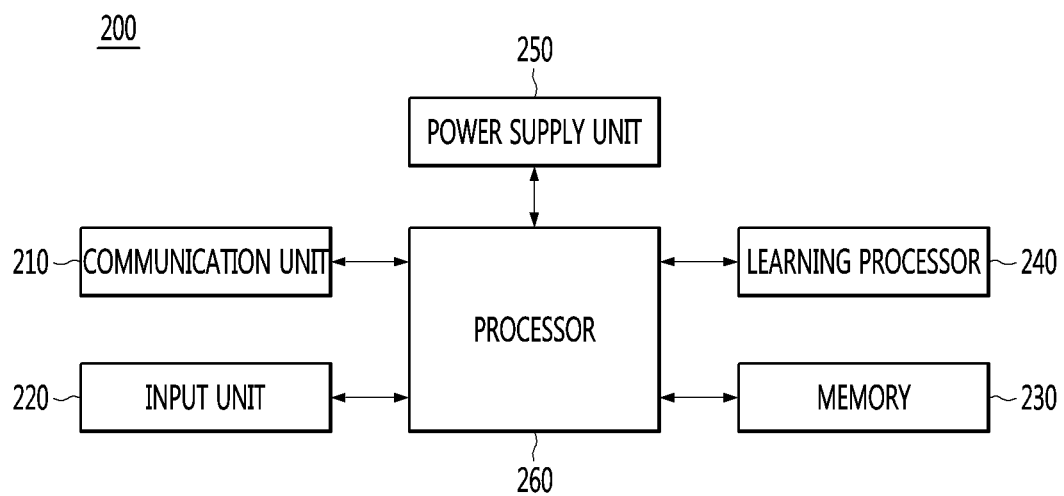
FIG. 3 is a block diagram illustrating a configuration of an apparatus for a noise canceling 200 according to an embodiment of the present invention.

FIG. 3 is a block diagram illustrating a configuration of an apparatus for a noise canceling 200 according to an embodiment of the present invention.

Referring to FIG. 3, the apparatus for noise canceling 200 may include a communication unit 210, an input unit 220, a memory 230, a learning processor 240, and a power supply unit 250.

The communication unit 210 is a component including the wireless communication unit 110 and the interface unit 160 of FIG. 2. That is, the communication unit 210 can transmit/receive data to/from another device through wire/wireless communication or an interface.

The input unit 220 is a component corresponding to the input unit 120 of FIG. 2 and may acquire data by receiving the data through the communication unit 210.

The memory 230 is a component corresponding to the memory 170 of FIG. 2.

The learning processor 240 is a component corresponding to the learning processor 130 of FIG. 2.

The power supply unit 250 is a component corresponding to the power supply unit 190 of FIG. 2.

Repeated description of components corresponding to each other is not provided.

Figure 4:
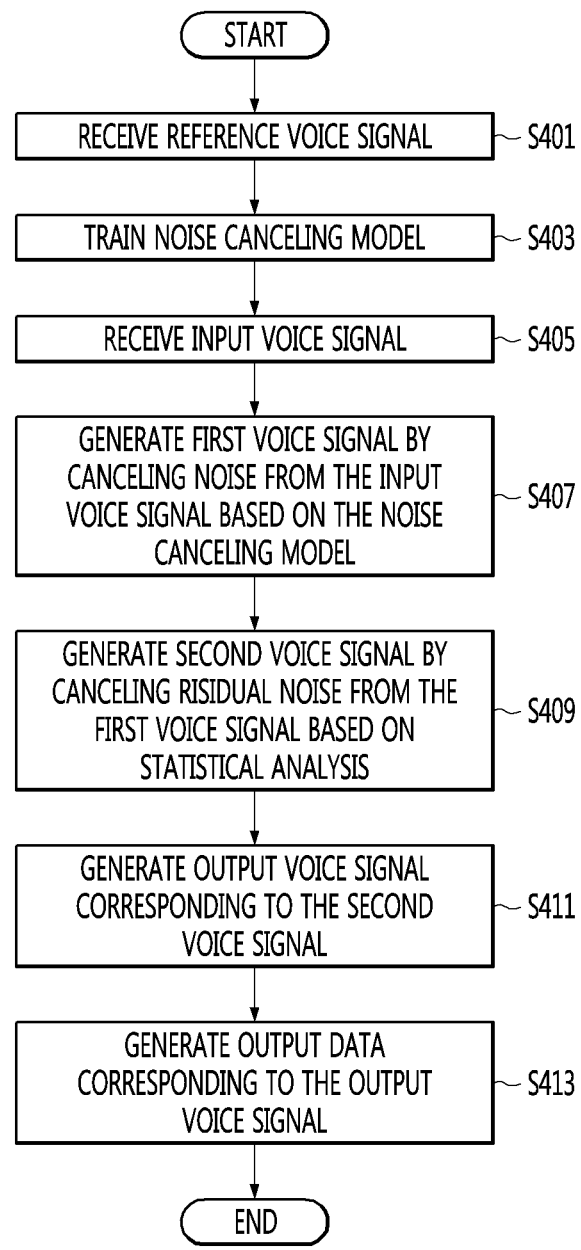
FIG. 4 is an operation flowchart illustrating a method for noise canceling according to an embodiment of the present invention.

FIG. 4 is a flowchart illustrating a method for noise canceling according to an embodiment of the present invention.

The method for noise canceling of the present invention can be performed in each of the user terminal device 100 or the apparatus for noise canceling 200, depending on embodiments.

That is, the method for noise canceling according to an embodiment of the present invention may be performed solely in the user terminal device 100 or solely in the apparatus for noise canceling 200. Alternatively, the method may be performed in both of the user terminal device 100 and the apparatus for noise canceling 200.

It is described hereafter that the method for noise canceling is performed in the apparatus for noise canceling 200, but the present invention is not limited thereto.

Figure 10:
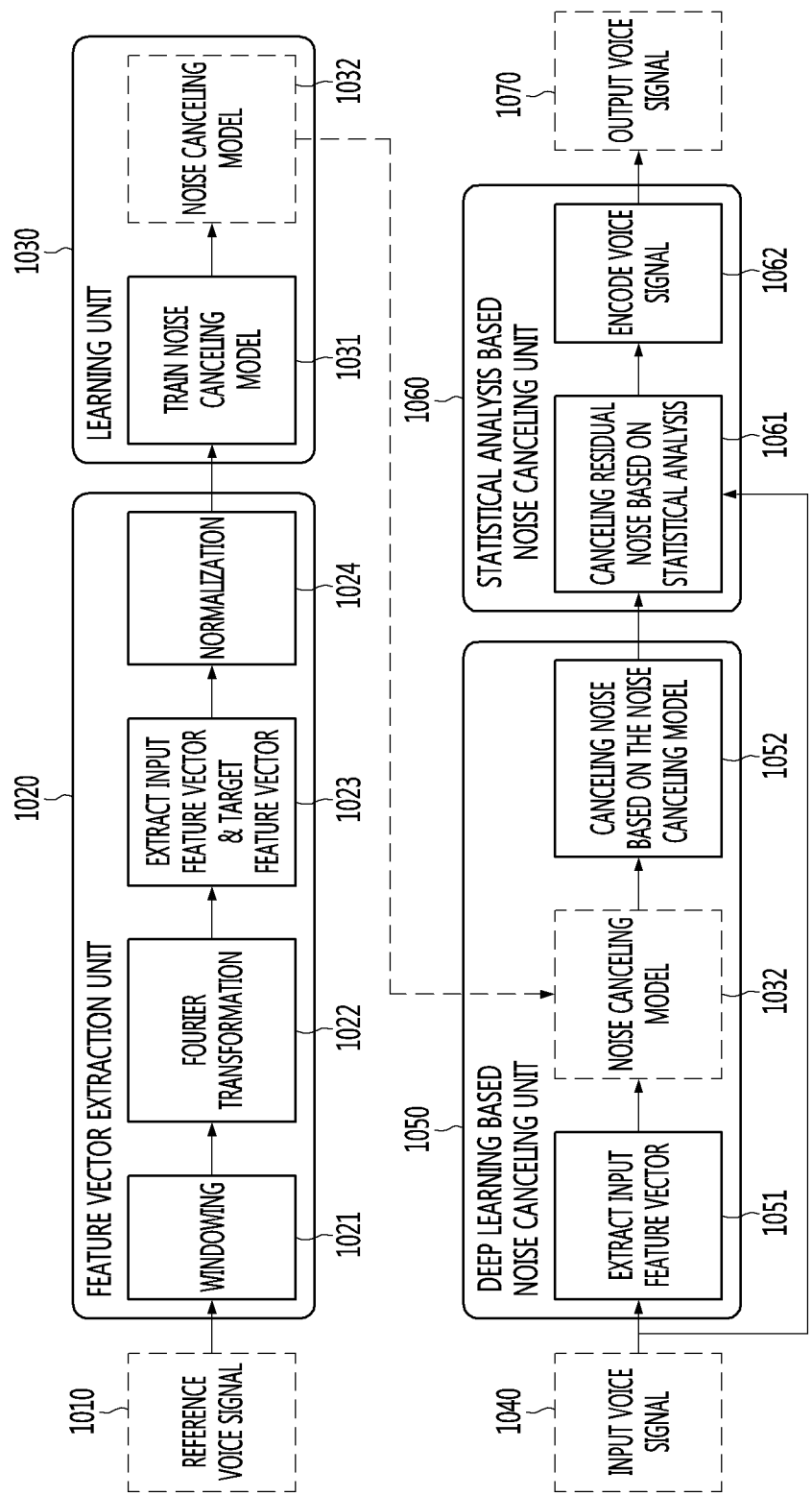
FIG. 10 is a block diagram illustrating a method for noise canceling according to an embodiment of the present invention.
Figure 11:
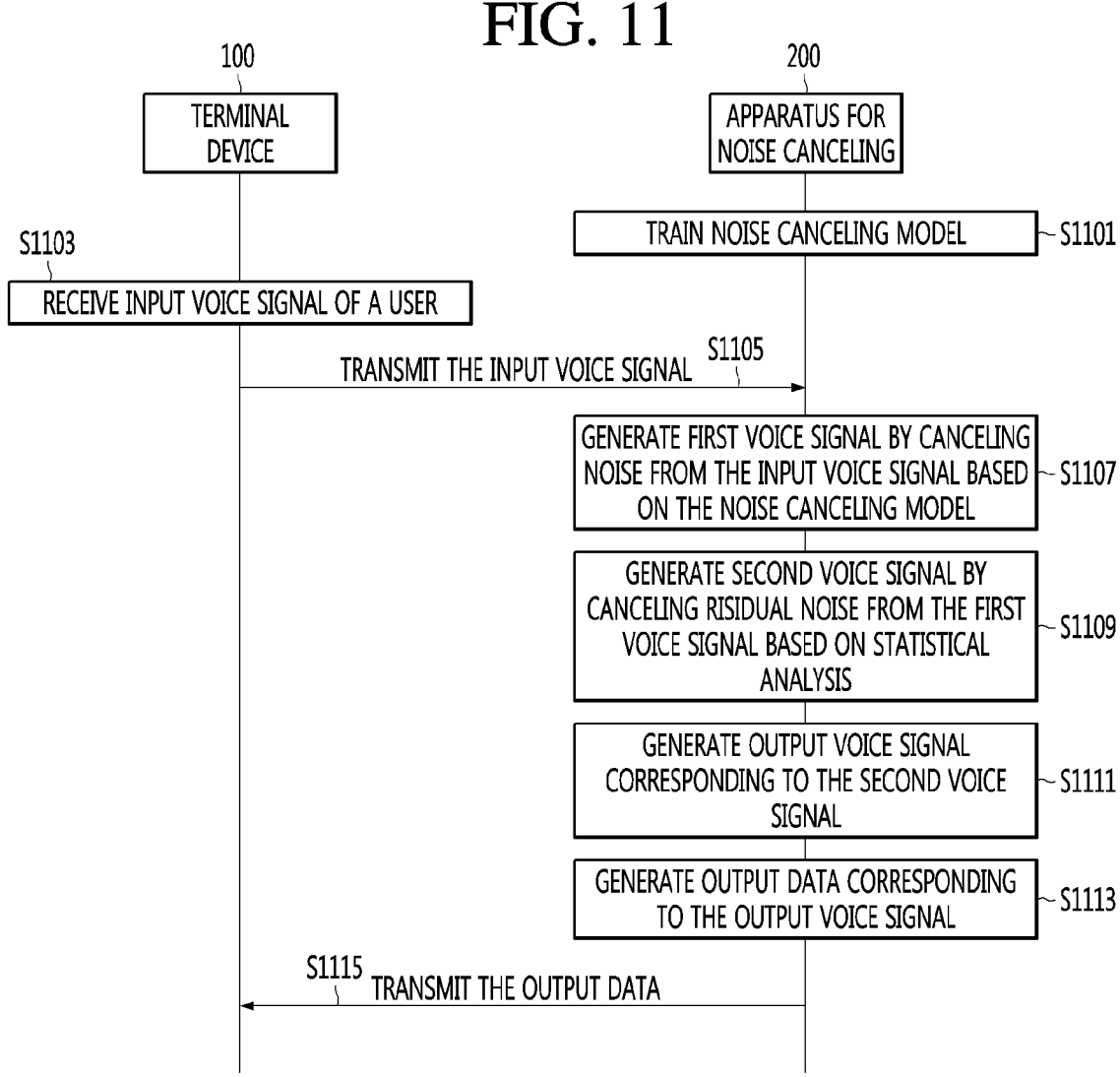
FIG. 11 is a ladder diagram illustrating a method for noise canceling according to an embodiment of the present invention.

In particular, an example in which the terminal device 100 and the apparatus for noise canceling 200 perform the method for noise canceling in association with each other will be introduced with reference to FIGS. 10 and 11.

Referring to FIG. 4, the input unit 220 of the apparatus for noise canceling 200 receives a reference voice signal for training a noise canceling model (S401).

The reference voice signal is used as input data for training the noise canceling model using a deep learning algorithm or a machine learning algorithm and is a voice signal including noise less than a predetermined level. That is, the reference voice signal is a clean voice signal for training.

The input unit 220 may receive a reference voice signal from a user or from another device (e.g., a user terminal device or a voice server), or may receive a reference voice signal stored in the memory 230.

The processor 260 of the apparatus for noise canceling 200 trains a noise canceling model using the reference voice signal (S403).

The processor 260 trains a noise canceling model using a plurality of reference voice signals and may use the same reference voice signals several times in the process of training.

The noise canceling model may be a deep neural network (DNN) model trained using a machine learning algorithm or a deep learning algorithm.

A method of training a noise canceling model is described in detail with reference to FIG. 5.

The input unit 220 of the apparatus for noise canceling 200 receives an input voice signal that is a target of noise canceling (S405).

Noise and voice may be included in the input voice signal.

The input unit 220 can receive the input voice signal from a user or another device.

For example, the input unit 220 may receive an input voice signal through the communication unit 210, where the input voice signal corresponds to user's voice acquired through a microphone 122 of the user terminal device 100.

The input unit may acquire an input voice signal corresponding to user's voice through a microphone (not shown) of the apparatus for noise canceling 200.

The input unit 220 can acquire an input voice signal corresponding to user's voice by recognizing a predetermined user's call word or wakeup word.

For example, when a predetermined call word is "Hi, LG" and a user says "Hi, LG", the input unit 220 can acquire a call word voice signal corresponding to the voice "Hi, LG" and the processor 260 can start the voice recognition and noise canceling function by analyzing the call word voice signal. When the voice recognition and noise canceling function is started, the input unit 220 can acquire an input voice signal corresponding to the user's voice.

The processor 260 of the apparatus for noise canceling 200 generates a first voice signal by canceling noise from the input voice signal on the basis of a noise canceling model (S407).

That is, the processor primarily cancels noise from the input voice signal using a noise canceling model trained using a machine learning algorithm or a deep learning algorithm.

The method of canceling noise using machine learning or deep learning provides an excellent ability to cancel noise from a noise source similar to voice, but does not cancel noise relatively well when noise has a strong signal at a low frequency band such as automotive noise.

Accordingly, the processor cancels a noise source similar to voice primarily on the basis of the noise canceling model trained using machine leaning or deep learning from the input voice signal. Residual noise is canceled by another technique.

The processor 260 of the apparatus for noise canceling 200 generates a second voice signal by canceling residual noise from the first voice signal on the basis of statistical analysis.

That is, the processor secondarily cancels noise through statistical analysis for the noise that has not been canceled through the noise canceling model.

The processor 260, in this process, can use a residual noise suppression technique that compares the input voice signal and the first voice signal with each other and then cancels residual noise using the difference of the two voice signals.

For example, it is possible to check the degree of noise cancelled by a noise canceling algorithm based on deep learning by comparing the input voice signal and the first voice signal, and then generate a second voice signal by determining how much noise to additionally cancel and canceling the noise.

As for noise having a signal at a low frequency band, a noise canceling technique considering a speech presence probability (SPP) through statistical analysis has a better noise canceling ability than a noise canceling technique of a noise canceling model trained through machine learning or deep learning.

Accordingly, the present invention uses a hybrid noise canceling technique that primarily cancels noise on the basis of a noise canceling model and then secondarily cancels noise on the basis of statistical analysis.

The processor 260 of the apparatus for noise canceling 200 generates an output voice signal corresponding to the second voice signal (S411).

The processor 260 can generate an output voice signal by performing Inverse Fourier transformation or inverse short-time Fourier transformation on the second voice signal.

The processor 260 of the apparatus for noise canceling 200 generates output data corresponding to the output voice signal (S413).

The output data may mean data for outputting an output voice signal into voice, but may be data for outputting response data, which corresponds to the meaning information of an output voice signal, into voice by analyzing the output voice signal.

For example, when the meaning information of an output voice signal is 'current weather' as a result of analyzing the output voice signal, the processor 260 can generate current weather information as output data in response to the meaning information.

If input output data is received from the terminal device 100, the generated output data can be transmitted to the terminal device 100 and the terminal device 100 can output the received output data.

The hybrid noise canceling technique proposed in the present invention uses both two kinds of noise canceling techniques, and accordingly, it is possible to cancel noise from an input voice signal with high accuracy while keeping all the advantages of both the techniques.

Figure 5:
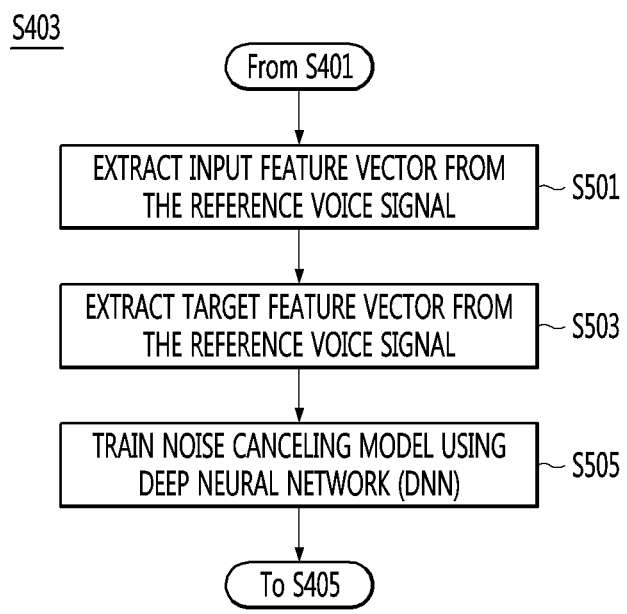
FIG. 5 is an operation flowchart illustrating an example of a step of training a noise canceling model (S403) shown in FIG. 4.

FIG. 5 is an operation flowchart illustrating an example of the step of training a noise canceling model (S403) shown in FIG. 4.

Referring to FIG. 5, the processor 260 of the apparatus for noise canceling 200 extracts an input feature vector from a reference voice signal (S501).

The extracted input feature vector is used to train a noise canceling model.

The input feature vector may be a log-power spectrum (LPS).

The processor 260 can extracts the input feature vector after performing windowing and Fourier transformation/short-time Fourier transformation on the reference voice signal as pre-processes.

A reference voice signal in a time domain can be converted into a frequency domain through Fourier transformation or short-time Fourier transformation.

The following Equation 1 is an equation that converts a reference voice signal in a time domain into a frequency domain through short-time Fourier transformation. k is a frequency bin index, M is a window length, h(m) is a window function, and f is a frequency domain.

$$X^f(k) = \sum_{m=0}^{M-1} y(m)h(m)e^{-j2\pi km/M}, k = 0, 1, \ldots, M-1 \quad \text{[Equation 1]}$$

A reference voice signal in a frequency domain can be converted into a log-power spectrum through the following Equation 2, and accordingly, an input feature vector can be extracted. K=M/2+1 and l is a log-power spectrum domain.

$$X^l(k) = \log|X^f(k)|, k=0,1,\ldots,M-1 \quad \text{[Equation 2]}$$

The following Equation 3 is an equation showing a phase feature vector of a reference voice input signal. p is a phase domain.

$$X^p(k) \triangleq \angle X^f(k), k=0,1,\ldots,M-1 \quad \text{[Equation 3]}$$

The processor 260 may normalize the extracted input feature vector.

The processor 260 of the apparatus for noise canceling 200 extracts a target feature vector from a reference voice signal (S503).

The extracted target feature vector is used to train a noise canceling model.

The target feature vector may be a log-power spectrum or an ideal ratio mask (IRM).

The IRM may be calculated using the following Equation 4. S(k, 1) is a clean signal and N(k, 1) is a noise signal.

$$IRM(k, l) = \sqrt{\frac{S(k, l)}{S(k, l) + N(k, l)}} \quad \text{[Equation 4]}$$

The processor 260 of the apparatus for noise canceling 200 may normalize the extracted target feature vector.

The processor 260 of the apparatus for noise canceling 200 trains a noise canceling model as a deep neutral network (DNN) model using the extracted input feature vector and target feature vector (S505).

If both the input feature vector and the target feature vector are log-power spectrums, severe distortion may occur in voice when a noise canceling model trained through deep learning did not perform spectrum estimation well.

In particular, in an environment with a low signal-to-noise ratio (SNR), it is difficult to perform a spectrum estimation and a spectrum is estimated with smoothing, so distortion of voice is relatively severe.

Accordingly, the deep neutral network model using an input feature vector and a target feature vector both as log-power spectrums may not be effective to be use in a pre-process of a voice recognizer.

If an input feature vector is a log-power spectrum and a target feature vector is an IRM, it is possible to estimate the IRM using a noise canceling model trained through deep learning for an input voice signal and it is also possible to indirectly estimate the low-power spectrum by multiplying the input voice signal by the estimated IRM.

The steps (S501, S503, and S505) can be performed by the processor 260 of the apparatus for noise canceling 200 using the learning processor 240.

The fact that the processor 260 uses the learning processor 240 may mean that distributed processing or parallel processing is performed using a processing resource of the learning processor 240 or may mean that the processor 260 controls the learning processor 240.

Figure 6:
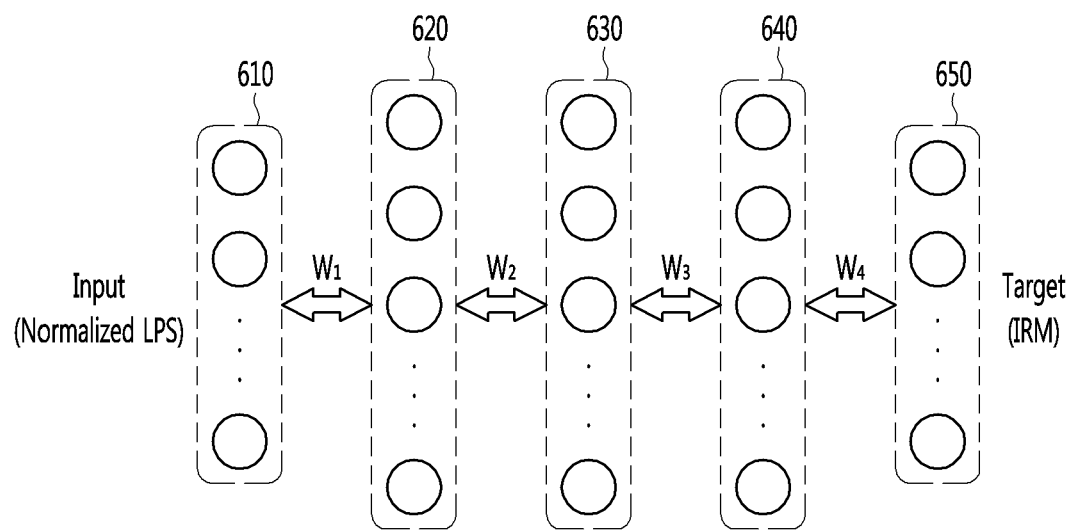
FIG. 6 is a diagram illustrating the structure of a noise canceling model of an embodiment of the present invention.

FIG. 6 is a diagram illustrating the structure of a noise canceling model of an embodiment of the present invention.

Referring to FIG. 6, a noise canceling model of an embodiment of the present invention may be configured as a deep neural network.

The noise canceling model of an embodiment of the present invention may include an input layer 610, a plurality of hidden layers 620, 630, and 640, and a single output layer 650.

The input layer 610 may use an extracted input feature vector as input data. The input feature vector may have been normalized.

The hidden layers each include a plurality of hidden nodes.

The hidden layers each may use a ReLU (Rectified Linear Unit) as an activation function.

The output layer may use a sigmoid as an activation function.

In an embodiment of the present invention, the input layer 610 may use a normalized log-power spectrum corresponding to a reference voice signal. The output layer 650 can output an IRM.

For example, the noise canceling model may include three hidden layers and each of the hidden layers may include 512 hidden nodes. In various embodiments, the number of hidden layers and the numbers of hidden nodes included in each of the hidden layers may be varied and the present invention does not limit the number of the hidden layers or the hidden nodes.

Training a noise canceling model through a machine learning or deep learning algorithm may be performed using the following Equation 5. E is a loss function that is used in a noise canceling model, N is a mini-batch size of training, D is the dimension of a feature vector, X is a target feature vector, and $\hat{X}$ is an estimated target feature vector estimated from the noise canceling model.

$$E = \frac{1}{N} \sum_{n=1}^{N} \sum_{d=1}^{D} \left[ \hat{X}_n^d(W^l, b^l) - X_n^d \right]^2 \quad \text{[Equation 5]}$$

In detail, the loss function E is a mean square error (MSE) of a result estimated from a noise canceling model and a target feature vector estimated from a reference voice signal.

The noise canceling model is trained to minimize E in Equation 5.

The following Equation 6 is used for gradient decent that is used for training to minimize the loss function E of the noise canceling model. l is hidden layers that are targets to train, L is the number of hidden layers, k is the number of training, W is a weight between nodes in the noise canceling model, b is the bias between nodes in the noise canceling model, and λ is a learning rate.

$$(W_{k+1}^l, b_{k+1}^l) \leftarrow (W_k^l, b_k^l) - \lambda \frac{\partial E}{\partial (W_k^l, b_k^l)}, 1 \leq l \leq L+1 \quad \text{[Equation 6]}$$

The weight W and the bias b are updated such that the loss function E is minimized by partially differentiating the loss function E of the noise canceling model with the weight W and the bias b through the Equation 6.

Inference of an IRM from the noise canceling model may be performed as in the following Equation 7. $W^{(l)}$ and $b^{(l)}$ are a weight and a bias between an l-th hidden layer and a (l−1)-th hidden layer, respectively, and $\phi^{(l)}$ is an activation function of the l-th hidden layer.

$$\overline{IRM} = W^{(L)}\phi^{(L)}(W^{(L-1)}\phi^{(L-1)}(\ldots W^{(1)}\phi^{(1)}(W^{(0)}x+b^{(0)})+b^{(1)}\ldots)+b^{(L-1)})+b^{(L)} \quad \text{[Equation 7]}$$

Figure 7:
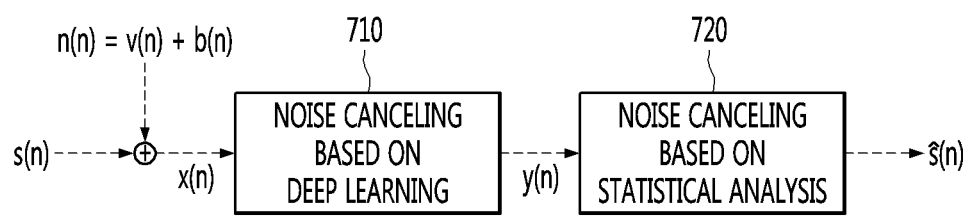
FIG. 7 is a diagram illustrating a process of generating a first voice signal and a second voice signal that correspond to input voice signal.

FIG. 7 is a diagram illustrating a process of generating a first voice signal and a second voice signal that correspond to input voice signals.

Referring to FIG. 7, noise can be classified into two kinds in broad meaning, which are a stationary noise v(n) and a non-stationary noise b(n).

The stationary noise is an easily predictable noise without a large change of noise power according to time such as a vehicle, an air-conditioner, and a cleaner and the non-stationary noise is noise with a large change of noise power according to time such as speech sound of a person, music, and TV sound and is difficult to predict.

A voice signal without noise is s(n) and an input voice signal is x(n).

The following Equation 8 shows noise n(n) that is input with a voice signal s(n) and the following Equation 9 shows an input voice signal x(n).

$$n(n)=v(n)+b(n) \quad \text{[Equation 8]}$$

$$x(n)=s(n)+n(n)=s(n)+v(n)+b(n) \quad \text{[Equation 9]}$$

A first voice signal y(n) is generated by canceling noise on the basis of a noise canceling model trained through deep learning for the input voice signal x(n) (710). That is, the first voice signal y(n) is a voice signal generated by primarily canceling noise from an input voice signal.

For example, as in the following Equation 10, it can be expected that stationary noise v(n) has been sufficiently canceled in the first voice signal y(n).

$$y(n) \approx s(n)+b(n) \quad \text{[Equation 10]}$$

A second voice signal ŝ(n) is generated by canceling residual noise on the basis of statistical analysis for the first voice signal y(n) (720). That is, the second voice signal ŝ(n) is a voice signal generated by secondarily canceling noise from the first voice signal.

For example, since the stationary noise v(b) has been sufficiently canceled from the first voice signal y(n) generated by primarily canceling noise, only non-stationary noise can be considered in the step of canceling residual noise (720).

Similarly, since some non-stationary noise may have been canceled in the step of primarily canceling noise (710), how much noise to cancel may be determined in consideration of the size of the residual noise in the step of canceling residual noise (720).

For example, as in the following Equation 11, it can be expected that non-stationary noise b(n) has been sufficiently canceled from the second voice signal ŝ(n)

$$\hat{s}(n) \approx s(n) \quad \text{[Equation 11]}$$

Figure 8:
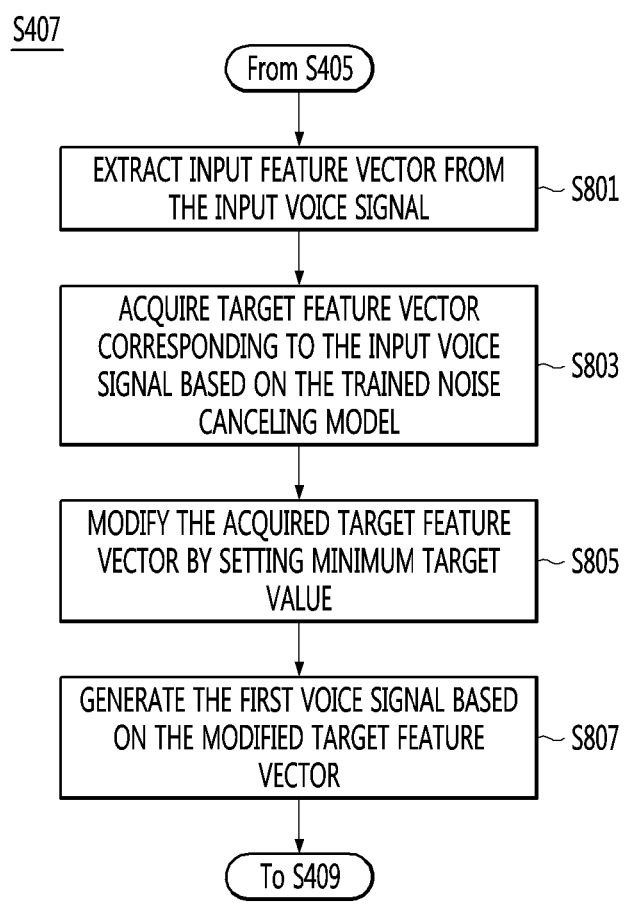
FIG. 8 is an operation flowchart illustrating an example of a step of generating the first voice signal (S407) shown in FIG. 4.

FIG. 8 is an operation flowchart illustrating an example of a step of generating the first voice signal (S407) shown in FIG. 4.

In detail, the step of generating a first voice signal (S407) means a primary noise canceling step that cancels noise from an input voice signal using a noise canceling model trained on the basis of machine learning or deep learning.

Referring to FIG. 8, the processor 260 of the apparatus for noise canceling 200 extracts an input feature vector from an input voice signal (S801).

The processor 260 may extract a log-power spectrum as the input feature vector from the input voice signal.

In this process, the processor 260 may extract the input feature vector after performing windowing and Fourier transformation as pre-processes on the input voice signal.

The processor 260 of the apparatus for noise canceling 200 acquires a target feature vector corresponding to the input voice signal on the basis of the trained noise canceling model (S803).

The target feature vector corresponding to the input voice signal may be acquired from an output layer by inputting the input feature vector extracted from the input voice signal into an input layer of the trained noise canceling model.

The processor 260 of the apparatus for noise canceling 200 corrects the target feature vector by setting a minimum target value (S805).

The target value is a separate value constituting the target feature vector and means the value of an output node included in the output layer.

The processor 260 can set a predetermined reference value as the minimum target value.

That is, the processor 160 can correct the target feature vector by changing target values smaller than the predetermined reference value into reference value.

For example, when target feature vector corresponding to an input voice signal is (0.12, 0.33, 0.89, 0.25) and the predetermined reference value is 0.2, the processor 260 can correct the target feature vector into (0.2, 0.33, 0.89, 0.25).

As the reference value is set to the minimum target value, the range of an IRM corresponding to the target value (the value of an output node) is corrected from [0, 1] into [reference value, 1]. Further, it is possible to acquire a corrected target vector by composing a vector with the corrected target values.

The processor 260 of the apparatus for noise canceling 200 generates a first voice signal on the basis of the corrected target feature vector (S807).

If the corrected target feature vector corresponds to a log-power spectrum, the processor 260 may acquire the log-power spectrum corresponding to the corrected target feature vector and may generate a voice signal corresponding to the acquired log-power spectrum as the first voice signal.

If the corrected target feature vector corresponds to an IRM, the processor 260 may acquire a log-power spectrum by multiplying the input voice signal by the IRM acquired from the corrected target feature vector and may generate a voice signal corresponding to the acquired log-power spectrum as the first voice signal.

The following Equation 12 is used to generate a first voice signal by canceling noise from an input voice signal using a corrected IRM as a corrected target feature vector. $X(k, l)$ is an input voice signal, $Y(k, l)$ is a first voice signal, $\overline{IRM}'$ is a corrected target feature vector corrected by setting a minimum gain or a minimum target value on $\overline{IRM}$.

$$Y(k,l) = \overline{IRM}'(k,l) \cdot X(k,l) \quad \text{[Equation 12]}$$

That is, the processor 260 may generate a first voice signal by multiplying an input voice signal by the IRM corrected by reflecting the minimum target value or the minimum gain.

The processor 260 may minimize distortion by correcting the IRM estimated through the noise canceling model even though a noise canceling model inappropriately estimate an IRM.

In the present invention, it is possible to prevent each frequency bin of an input voice signal from being multiplied by 0 or a very small value by inducing the minimum gain, and accordingly, it is possible to minimize distortion of a first voice signal to generate even though the noise canceling model fails in estimating noise cancel.

The steps (S801, S803, S805, and S807) can be performed by the processor 260 of the apparatus for noise canceling 200 using the learning processor 240.

Further, the steps (S801, S803, S805, and S807) can be performed by the terminal device 100.

For example, the terminal device 100 can generate a first voice signal by receiving a noise canceling model trained by the apparatus for noise canceling 200 and canceling noise from an input voice signal using the noise canceling model.

Figure 9:
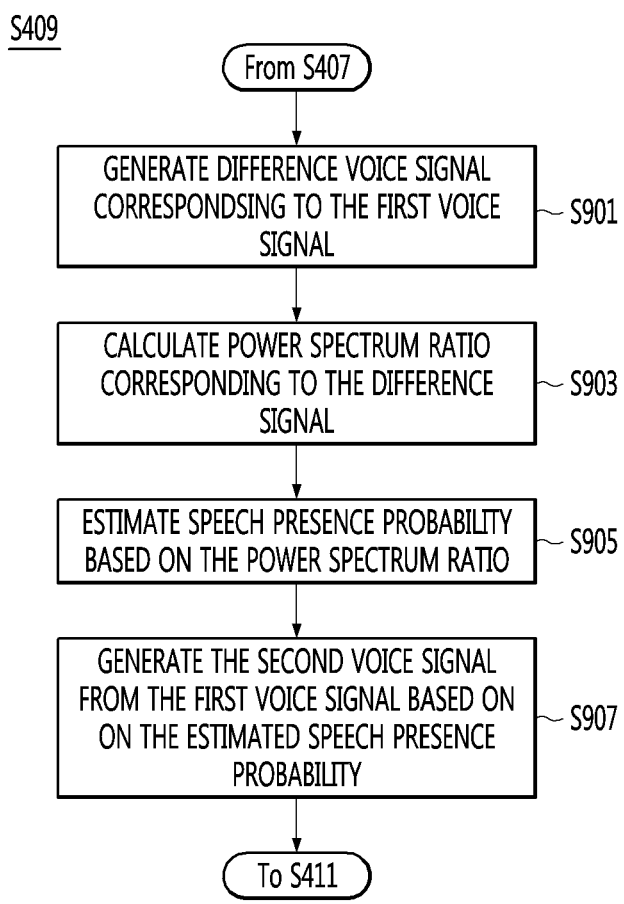
FIG. 9 is an operation flowchart illustrating an example of a step of generating the second voice signal (S409) shown in FIG. 4.

FIG. 9 is an operation flowchart illustrating an example of a step of generating the second voice signal (S409) shown in FIG. 4.

In detail, the step of generating a second voice signal (S409) means a secondary noise canceling step that cancels residual noise from the first voice signal on the basis of statistical analysis.

Referring to FIG. 9, the processor 260 of the apparatus for noise canceling 200 generates a residual voice signal or a difference voice signal that correspond to the first voice signal (S901).

The residual voice signal or the difference voice signal may be a signal obtained by subtracting the first voice signal from the input voice signal.

The residual voice signal or the difference voice signal may be a difference signal between the input voice signal and the first voice signal.

For example, the power spectrum $\phi_{XX}$ of the input voice signal is defined as in the following Equation 13 and the power spectrum $\phi_{YY}$ of the first voice signal is defined as in the following Equation 14. $B_R$ is a residual non-stationary noise.

$$\phi_{XX} = \phi_{SS} + \phi_{BB} \quad \text{[Equation 13]}$$

$$\phi_{YY} = \phi_{SS} + \phi_{B_R B_R} \quad \text{[Equation 14]}$$

The residual non-stationary noise $B_R$ may be expressed as in the following Equation 15, $g_B(k, l)$ is an IRM for a non-stationary noise acquired from a noise canceling model, and $B(k, l)$ is a non-stationary noise signal included in the input voice signal.

$$B_R(k,l) = g_B(k,l) \cdot B(k,l) \quad \text{[Equation 15]}$$

For example, when a difference signal is obtained by subtracting a first voice signal from an input voice signal, the power spectrum density of the difference voice signal may be defined as in the following Equation 16.

$$\phi_{XX} - \phi_{YY} = \phi_{BB} - \phi_{B_R B_R} = (1 - g_B^2) \cdot \phi_{BB} \quad \text{[Equation 16]}$$

The processor 260 of the apparatus for noise canceling 200 calculates a power spectrum ratio corresponding to the residual voice signal or the different voice signal (S903).

The power spectrum ratio $\gamma$ of the input voice signal and the difference voice signal may be defined as in the following Equations 17 to 19.

$$\gamma = \frac{\phi_{XX}}{\phi_{XX} - \phi_{YY}} = \frac{\phi_{SS} + \phi_{BB}}{(1 - g_B^2) \cdot \phi_{BB}} = \frac{1}{1 - g_B^2} \left( \frac{\phi_{SS}}{\phi_{BB}} + 1 \right) = \gamma_\alpha \cdot \gamma_\beta \quad \text{[Equation 17]}$$

$$\gamma_\alpha = \frac{1}{1 - g_B^2} \quad \text{[Equation 18]}$$

$$\gamma_\beta = \frac{\phi_{SS}}{\phi_{BB}} + 1 \quad \text{[Equation 19]}$$

The processor 260 of the apparatus for noise canceling 200 estimates a speech presence probability on the basis of the power spectrum ratio (S905).

The speech presence probability (SPP) that is estimated in the present invention is a speech presence probability redefined by additionally correcting a speech presence probability in the related art.

For example, the states of a noiseless voice signal s(n) and a non-stationary noise b(n) may be discriminated as in the following Equations 20 to 22.

$$|s(n)|>|b(n)| \rightarrow g_B \approx 1, \therefore \gamma_\alpha >>1, \gamma_\beta >>2 \rightarrow \gamma >>2 \quad \text{[Equation 20]}$$

$$|s(n)|\approx|b(n)| \rightarrow 0 \leq g_B \leq 1, \therefore \gamma_\alpha \geq 1, \gamma_\beta \approx 2 \rightarrow \gamma \geq 2 \quad \text{[Equation 21]}$$

$$|s(n)|<|b(n)| \rightarrow g_B \approx 0, \therefore \gamma_\alpha \approx 1, 1<\gamma_\beta <2 \rightarrow 1<\gamma<2 \quad \text{[Equation 22]}$$

The processor 260 may discriminate the state of noise into three kinds (when the power of voice is larger than, similar to, and smaller than non-stationary noise) in order to cancel residual noise with minimizing distortion of voice, and may estimate a speech presence probability to fit to each states.

For example, the speech presence probability in the related art may be redefined as in the following Equation 23. α and β, which are parameters that are used to adjust the intensity of a speech presence probability when the speech presence probability is redefined, may be selected as an optimal value or a best value through a test or training.

$$P_s(l) = \begin{cases} P_s(l), & \gamma(l) > 2 \\ \alpha(\gamma(l) - \beta) \cdot P_s(l), & \text{otherwise} \end{cases} \quad \text{[Equation 23]}$$

It is possible to estimate the power spectrum density of the residual noise more accurately through the speech presence probability estimated as described above.

The processor 260 of the apparatus for noise canceling 200 generates a second voice signal by canceling residual noise from the first voice signal on the basis of the estimated speech presence probability (S907).

For example, the processor 260 may estimate an OMLSA (optimally modified log spectral amplitude) gain on the basis of the estimated speech presence probability and may generate a second voice signal from the first voice signal using the OMLSA gain.

The steps (S901, S903, S905, and S907) may be performed by the processor 260 of the apparatus for noise canceling 200 using the learning processor 240.

Further, the steps (S901, S903, S905, and S907) may be performed by the terminal device 100.

For example, the terminal device 100 may generate a second voice signal by canceling residual noise from the first voice signal.

FIG. 10 is a block diagram illustrating a method for noise canceling according to an embodiment of the present invention.

Referring to FIG. 10, a method for noise canceling trains a noise canceling model 1032, primarily cancels noise on the basis of the noise canceling model 1032, and secondarily cancels noise on the basis of statistical analysis.

In detail, when a reference voice signal 1010 having no noise or having noise smaller than a predetermined reference value for training the canceling model 1032 is received, a feature vector extraction unit 1020 performs windowing 1021 and Fourier transformation 1022 as pre-processes on the reference voice signal 1010.

The feature vector extraction unit 1020 extracts an input feature vector and an output feature vector for the pre-processed reference voice signal (1023) and normalizes the extracted input feature vector and output feature vector (1024).

A learning unit 1030 trains a noise canceling model based on a deep neural network using an input feature vector and an output feature vector that correspond to the reference voice signal 1010 (1031). The trained noise canceling model 1032 may be used to cancel noise later from the input voice signal.

Next, when an input voice signal that is a target of noise canceling is input, a deep learning-based noise canceling unit 1050 extracts an input feature vector for the input voice signal 1040 (1051).

Though not shown, windowing and Fourier transformation may be performed as pre-processes on the input voice signal before the input feature vector is extracted.

The deep learning-based noise canceling unit 1050 primarily cancels noise from the input voice signal 1040 using the input feature vector extracted from the input voice signal 1040 on the basis of the trained noise canceling model 1032 (1052).

The result of primarily canceling noise from the input voice signal is a first voice signal.

A statistical analysis-based noise canceling unit 1060 cancels residual noise included in the first voice signal using the first voice signal and the input voice signal 1040 on the basis of statistical analysis.

The result of canceling residual noise from the first voice signal is a second voice signal.

The statistical analysis-based noise canceling unit 1060 may generate an output voice signal 1070 by encoding the second voice signal.

For example, encoding the second voice signal may means inverse Fourier transformation.

Although it is shown in FIG. 10 that the second voice signal is encoded by the statistical analysis-based noise canceling unit 1060, the present invention is not limited thereto. It may be possible to generate an output voice signal by encoding the second voice signal using another voice processing unit.

The following Table 1 shows the result of a test comparing noise canceling abilities of a noise canceling technique based on only deep learning and a hybrid noise canceling technique based on deep learning and statistical analysis according to an embodiment of the present invention. In detail, Table 1 shows the result of comparing a sentence recognition rate when noise is cancelled from an input voice signal.

TABLE 1

| Noise_SNR_Distance_Reverberation | Deep learning only | Deep learning + Statistical analysis |
|---|---|---|
| Kids_SNR15_3m_0.3 | 81.00% | 84.00% |
| TV_SNR15_3m_0.3 | 77.50% | 81.50% |
| Pub_SNR15 | 82.50% | 87.00% |
| Airconditioner_SNR0 | 70.00% | 72.50% |
| Average | 77.75% | 81.25% |

It can be seen that the sentence recognition rate was improve by 3.5% on average in comparison to the related art in an environment using four kinds of general smart phones even under the conditions of various noise, a signal-to-noise ratio (SNR), a distance, and reverberation.

FIG. 11 is a ladder diagram illustrating a method for noise canceling according to an embodiment of the present invention.

In detail, FIG. 11 shows an embodiment in which the terminal device 100 function as a relay that receives user's voice and outputs the result and the apparatus for noise canceling 200 performs a substantial process for canceling noise.

The apparatus for noise canceling 200 trains a noise canceling model (S1101).

The noise canceling model can be trained using a reference voice signal including noise less than a predetermined level.

The terminal device 100 receives an input voice signal corresponding to user's voice (S1103) and transmits the received input voice signal to the apparatus for noise canceling 200 (S1105).

The apparatus for noise canceling 200 generates a first voice signal by canceling noise from the input voice signal on the basis of trained noise canceling model (S1107) and generates a second voice signal by canceling residual noise from the first voice signal on the basis of statistical analysis (S1109).

The apparatus for noise canceling 200 generates an output voice signal corresponding to the second voice signal (S1111).

The output voice signal may be a voice signal obtained by converting the second voice signal in a frequency domain into a time domain.

For example, the apparatus for noise canceling 200 may generate an output voice signal by performing inverse Fourier transformation or inverse short-time Fourier transformation on the second voice signal.

The apparatus for noise canceling 200 generates output data corresponding to the output voice signal (S1113).

The output data may mean data for outputting an output voice signal into voice, but may be data for outputting response data, which corresponds to the meaning information of an output voice signal, into voice by analyzing the output voice signal.

For example, when the meaning information of an output voice signal is 'current weather' as a result of analyzing the output voice signal, the apparatus for noise canceling 200 can generate current weather information as response data in response to the meaning information.

The apparatus for noise canceling 200 transmits the generated output data to the terminal device 100 (S1115).

Though not shown in FIG. 11, the terminal device 100 may output and provide the received output data to the user.

Further, when a predetermined wakeup word or call word is recognized or a wakeup interaction occurs, the terminal device 100 may start a noise canceling process and receive an input voice signal.

When the noise canceling process is started, the terminal device 100 may receive input voice signals and transmit the received input voice signals to the apparatus for noise canceling 200 in real time and the apparatus for noise canceling 200 may continuously generate output data by canceling noise from the received input voice signals and transmit the output data to the terminal device 100.

FIG. 12 is a ladder diagram illustrating a method for noise canceling according to an embodiment of the present invention.

In detail, FIG. 12 shows an embodiment in which the apparatus for noise canceling 200 only trains a noise canceling model using a deep learning algorithm and provides the trained noise canceling model to the terminal device 100 and the terminal device 100 performs a substantial process for canceling noise from an input voice signal.

The apparatus for noise canceling 200 trains a noise canceling model (S1201) and transmits the trained noise canceling model to the terminal device 100 (S1203).

The terminal device 100 stores the received noise canceling model (S1205) and receives an input voice signal corresponding to user's voice (S1207).

The terminal device 100 generates a first voice signal by canceling noise from the input voice signal on the basis of trained noise canceling model (S1209), generates a second voice signal by canceling residual noise from the first voice signal on the basis of statistical analysis (S1211), and generate an output voice signal corresponding to the second voice signal (S1213).

The terminal device 100 generates output data corresponding to the output voice signal (S1215).

Though not shown in FIG. 12, the terminal device 100 may output and provide the generated output data to the user.

Further, when a predetermined wakeup word or call word is recognized or a wakeup interaction occurs, the terminal device 100 may start a noise canceling process and receive an input voice signal.

When the noise canceling process is started, the terminal device 100 may generate output data by receiving input voice signals in real time and continuously canceling noise from the received input voice signals.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

The above-described terminal is not applied to be limited to the configuration and method of the above-described embodiments and may be configured by selectively combining all or some of the embodiments so that the embodiments are variously modified.

What is claimed is:

1. An apparatus for noise canceling, comprising:
an input unit configured to receive an input voice signal; and
one or more processors configured to:
   perform a first noise cancellation using as input the received input voice signal to generate a first voice signal by cancelling noise from the input voice signal using a noise canceling model which is trained using a plurality of reference voice signals;
   perform a second noise cancellation using as input the first voice signal generated by the noise canceling model to generate a second voice signal in which residual noise is canceled from the first voice signal using statistical analysis; and
   generate an output voice signal comprising an encoding of the second voice signal,
wherein the noise canceling model is a deep neural network (DNN) trained using a first input feature vector and a first target feature vector extracted from the plurality of reference voice signals, and
wherein the first input feature vector is a feature vector corresponding to a log-power spectrum (LPS), and the first target feature vector is a feature vector corresponding to an ideal ratio mask (IRM).

2. The apparatus of claim 1, wherein the input voice signal is compared with the first voice signal to determine a difference, and wherein the second noise cancellation is performed based on the determined difference.

3. The apparatus of claim 2, wherein the second noise cancellation is performed only when the determined difference is above a particular threshold.

4. The apparatus of claim 1, wherein the one or more processors are further configured to:
extract a second input feature vector from the input voice signal;
acquire a second target feature vector corresponding to the input voice signal and the second input feature vector through the first noise cancellation;
generate a third target feature vector from the second target feature vector by setting to a reference value, target values of the second target feature vector which are less than the predetermined reference value; and
generate the first voice signal from the input voice signal based on the third target feature vector.

5. The apparatus of claim 1, wherein the one or more processors are further configured to:
determine a speech presence probability (SPP) on the basis of the first voice signal;
estimate an OMLSA (optimally modified log spectral amplitude) gain using the SPP; and
generate the second voice signal from the first voice signal using the OMLSA gain.

6. The apparatus of claim 5, wherein the one or more processors are further configured to:
correct the SPP based on a difference between the first voice signal and the input voice signal;
estimate a corrected OMLSA gain using the corrected SPP; and
generate the second voice signal using the corrected OMLSA gain.

7. The apparatus of claim 6, wherein the one or more processors are further configured to:
calculate a ratio of a power spectrum density of the input voice signal and a power spectrum density of the difference between the first voice signal and the input voice signal; and correct the SPP based on the calculated ratio.

8. The apparatus of claim 1, wherein:
the deep neural network includes a plurality of hidden layers and a single output layer;
the plurality of hidden layers each includes a plurality of hidden nodes utilizing a rectified linear unit (ReLU) activation function; and
the output layer utilizes a sigmoid activation function.

9. The apparatus of claim 8, wherein a loss function of the deep neural network is a mean squared error between a target feature vector estimated from the first input feature vector and the first target feature vector.

10. The apparatus of claim 1, wherein the one or more processors are further configured to learn the noise canceling model by using a deep learning algorithm.

11. The apparatus of claim 1, further comprising:
a communication unit; and
a memory configured to store information,
wherein the noise canceling model is received from an external server via the communication unit and stored in the memory for performing the first noise cancellation.

12. A method for noise canceling, comprising:
receiving an input voice signal;
performing a first noise cancellation using as input the received input voice signal to generate a first voice signal by cancelling noise from the input voice signal using a noise canceling model which is trained using a plurality of reference voice signals;
performing a second noise cancellation using as input the first voice signal generated by the noise canceling model to generate a second voice signal in which residual noise is canceled from the first voice signal using statistical analysis; and
generating an output voice signal comprising an encoding of the second voice signal,
wherein the noise canceling model is a deep neural network (DNN) trained using a first input feature vector and a first target feature vector extracted from the plurality of reference voice signals, and
wherein the first input feature vector is a feature vector corresponding to a log-power spectrum (LPS), and
the first target feature vector is a feature vector corresponding to an ideal ratio mask (IRM).

13. A machine-readable non-transitory medium having stored thereon machine-executable instructions for noise canceling, the instructions comprising:
receiving an input voice signal;
performing a first noise cancellation using as input the received input voice signal to generate a first voice signal by cancelling noise from the input voice signal using a noise canceling model which is trained using a plurality of reference voice signals;
performing a second noise cancellation using as input the first voice signal generated by the noise canceling model to generate a second voice signal in which residual noise is canceled from the first voice signal using statistical analysis; and
generating an output voice signal comprising an encoding of the second voice signal
wherein the noise canceling model is a deep neural network (DNN) trained using a first input feature vector and a first target feature vector extracted from the plurality of reference voice signals, and
wherein the first input feature vector is a feature vector corresponding to a log-power spectrum (LPS), and
the first target feature vector is a feature vector corresponding to an ideal ratio mask (IRM).

* * * * *